United States Patent
Fu et al.

(10) Patent No.: US 12,227,195 B2
(45) Date of Patent: Feb. 18, 2025

(54) HYPOTHESIS INFERENCE FOR VEHICLES

(71) Applicant: ZENSEACT AB, Gothenburg (SE)

(72) Inventors: Junsheng Fu, Nödinge (SE); Axel Beauvisage, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 241 days.

(21) Appl. No.: 18/146,576

(22) Filed: Dec. 27, 2022

(65) Prior Publication Data
US 2023/0202497 A1    Jun. 29, 2023

(30) Foreign Application Priority Data

Dec. 28, 2021  (EP) .................................... 21218005

(51) Int. Cl.
*B60W 50/06*  (2006.01)
*B60W 10/18*  (2012.01)
(Continued)

(52) U.S. Cl.
CPC ............ *B60W 50/06* (2013.01); *B60W 10/18* (2013.01); *B60W 10/20* (2013.01);
(Continued)

(58) Field of Classification Search
CPC ...... B60W 50/06; B60W 10/18; B60W 10/20; B60W 60/001; B60W 2552/53; B60W 2554/404; B60W 2555/60; B60W 2556/00; B60W 40/04; B60W 50/00; B60W 10/04; B60W 40/06; B60W 2552/00; B60W 2552/50; G01C 21/3815; G01C 21/005; G01C 21/30; G01C 21/3602;
(Continued)

(56) References Cited

U.S. PATENT DOCUMENTS

2019/0100200 A1*  4/2019  McNew ............... G06V 20/588

FOREIGN PATENT DOCUMENTS

EP    3339807 A1    6/2018

OTHER PUBLICATIONS

Choi, Kyoungtaek et al.; "Detection-Verification-Cascade-Based Low-Cost Precise Vehicle Positioning Exploiting Extended Digital Map"; IEEE Access, vol. 9, Jan. 8, 2021; pp. 11065-11079, 15 pages.
(Continued)

*Primary Examiner* — Rodney A Butler
(74) *Attorney, Agent, or Firm* — Sage Patent Group

(57) ABSTRACT

The present disclosure relates to a method for determining a state of a vehicle on a road portion having two or more lanes. The method comprises obtaining map data associated with the road portion and positioning data indicating a position of the vehicle on the road and a sensor data from a sensor system of the vehicle. The method further comprises initializing a filter per lane of the road portion based on the obtained map data, the obtained positioning data, and the obtained sensor data, wherein each filter indicates an estimated state of the vehicle on the road portion. Then, selecting one of the initialized filters using a trained machine-learning algorithm, configured to use the obtained map data, the positioning data, the sensor data, and each estimated state as indicated by each filter as input and to output a current state of the vehicle on the road portion.

15 Claims, 4 Drawing Sheets

(51) Int. Cl.
*B60W 10/20* (2006.01)
*B60W 60/00* (2020.01)
*G01C 21/00* (2006.01)

(52) U.S. Cl.
CPC ....... *B60W 60/001* (2020.02); *G01C 21/3815* (2020.08); *B60W 2552/53* (2020.02); *B60W 2554/404* (2020.02); *B60W 2555/60* (2020.02); *B60W 2556/00* (2020.02)

(58) Field of Classification Search
CPC .. G01C 21/1656; G06N 20/00; G06V 10/778; G06V 20/588
See application file for complete search history.

(56) References Cited

OTHER PUBLICATIONS

Extended European Search Report mailed Jun. 17, 2022 for European Application No. 21218005.3, 8 pages.

\* cited by examiner

HYPOTHESIS INFERENCE FOR VEHICLES

CROSS-REFERENCE TO RELATED APPLICATIONS

The present application for patent claims priority to European Patent Office Application Ser. No. 21218005.3, entitled "HYPOTHESIS INFERENCE FOR VEHICLES" filed on Dec. 28, 2021, assigned to the assignee thereof, and expressly incorporated herein by reference.

TECHNICAL FIELD

The present disclosure relates to determining a state of a vehicle on a road. More specifically, the present disclosure relates to initialization of filters for the vehicle on a road and systems and methods for selection of the initialized filters by means of machine learning algorithms to determine the state of the vehicle on the road.

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC) collision avoidance system, forward collision warning, etc.— are electronic systems that may aid a vehicle driver while driving. Today, there is ongoing research and development within a number of technical areas associated to both the ADAS and the Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

An important requirement for autonomous and semi-autonomous vehicles is that they are able to estimate the pose i.e. the state (position and orientation) of the vehicle with accuracy and consistency since this is an important safety aspect when the vehicle is moving within traffic. Conventionally, satellite based positioning systems (Global Navigation Satellite Systems, GNSS), like for instance Global Positioning System (GPS), Globalnaya Navigazionnaya Sputnikovaya Sistema (GLONASS), Galileo, Beidou, have been used for positioning purposes.

However, these and other regional systems, in their most basic form, are often not accurate enough to rely on solely for determining the pose of a moving vehicle in autonomous applications. Improving the accuracy of such systems often require costly hardware and sensory equipment. Moreover, GNSS-based solutions have even less accuracy in determining height information.

Alternatively, there are systems and methods which utilize HD-map information together with a number of different sensors to increase the reliability of the map position such as cameras, LIDAR, RADAR, and other sensors for determining vehicle travelling parameters such as speed, angular rate and so on. However, even given current vehicle pose, it is still hard to predict a robust vehicle pose estimation by only odometry due to the measurement noise from different measurement sensors, e.g. motion sensors.

There is thus a need in the art for new and improved solutions for determining the state of the vehicle on the road with more certainty and accuracy.

SUMMARY

It is therefore an object of the present invention to provide a system, a vehicle comprising such a system, a method, and a computer-readable storage medium, which alleviate all or at least some of the drawbacks of presently known solutions.

More specifically, it is an object of the present invention to alleviate problems related to determination of state of a vehicle comprising an Automated Driving System (ADS) feature on a road portion having two or more lanes.

These objects are achieved by means of a system, a vehicle comprising such a control system, a method, and a computer-readable storage medium, as defined in the appended independent claims. The term exemplary is in the present context to be understood as serving as an instance, example or illustration.

According to a first aspect of the present invention, there is provided a method for determining a state of a vehicle on a road portion having two or more lanes, the vehicle comprising an Automated Driving System (ADS) feature. The method comprises obtaining map data associated with the road portion. The method further comprises obtaining positioning data indicating a position of the vehicle on the road and obtaining sensor data from a sensor system of the vehicle. Further, the method comprises initializing a filter per lane of the road portion based on the obtained map data, the obtained positioning data, and the obtained sensor data, wherein each filter indicates an estimated state of the vehicle on the road portion. Further, the method comprises selecting one of the initialized filters by means of a trained machine-learning algorithm configured to use the obtained map data, the obtained positioning data, the obtained sensor data, and each estimated state as indicated by each filter as input and to output a single selected initialized filter indicative of a current state of the vehicle on the road portion and controlling the ADS feature of the vehicle based on the selected initialized filter.

According to the presented method, by employing a data-driven approach comprising the use of machine learning algorithms to identify and select the most promising initialized filter out of the plurality of initialized filters per lane of a multi-lane road, the possibilities of accurately and efficiently estimating the state of the vehicle on the road portion may be improved. This advantage is particularly noteworthy in comparison with rule-based algorithm designs for identifying the most accurate initialized filter indicative of the state of the vehicle on the road portion.

Even though the rule-based approaches may be capable of accurately determining the state of the vehicle on the road portion, the likelihood of avoiding unforeseeable corner cases is considerably enhanced by training and employing the machine learning algorithm according to the present invention. In other words, employing a machine learning algorithm to select one of the initialized filters may provide a more generic vehicle-positioning means that is more robust to corner cases as compared to conventional solutions.

To this end, the trained machine learning algorithm is used to influence and promote behavior that leads to an increased possibility of generating interesting scenarios, including the corner case scenarios involving multiple environmental variables or conditions happening simultaneously or outside the conventional levels. Further, the versatility of the proposed solution establishes the proposed method, and corresponding system and vehicle to be readily adaptable for varying traffic situations or road and transportation infrastructure in different countries.

According to some embodiments, each initialized filter may be one of a Bayesian filter and a combination of multiple Bayesian filters. In several embodiments, each Bayesian filter may be one of Kalman Filter, Extended Kalman Filter, EKF, Unscented Kalman Filter, UKF, Cubature Kalman Filter, CKF, and Particle Filter, PF.

In various embodiments, the obtained sensor data may comprise information about a state of one or more other vehicles in the surrounding environment of the vehicle, lane marker geometry, lane marker type, traffic sign information, road barrier information, and Inertial Measurement Unit, IMU, data. In various embodiments the map data may comprise HD-map data.

In several embodiments, initializing the filter per lane of the road portion may comprise, for each filter continuously obtaining the positioning data of the vehicle on the road over time. The method may comprise obtaining sensor data comprising at least one of acceleration and velocity of the vehicle and determining a longitudinal position of the vehicle on the road portion. In various embodiments, initializing the filter per lane of the road portion may comprise for each filter obtaining sensor data comprising the lane marker geometry and a relative distance of the vehicle from the lane markers on the road portion. The method may further comprise determining an in-lane lateral position and heading of the vehicle on the road portion.

In several embodiments each filter may be initialized based on the determined longitudinal position and in-lane lateral position and heading of the vehicle on the road portion for each filter.

According to several embodiments, the method may further comprise obtaining a signal indicative of a desired activation of the ADS feature. Accordingly, controlling the ADS feature of the vehicle may comprise activating the ADS feature after the selection of the initialized filter has been made and using the selected initialized filter to indicate the vehicle's state on the road.

According to a second aspect of the present invention there is provided a (non-transitory) computer-readable storage medium storing one or more programs configured to be executed by one or more processors of a processing system, the one or more programs comprising instructions for performing the method according to any one of the embodiments of the method disclosed herein.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present invention, there is provided a computer program product comprising instructions which, when the program is executed by one or more processors of a processing system, causes the processing system to carry out the method according to any one of the embodiments of the method disclosed herein.

According to a further fourth aspect, there is provided a system for determining a state of a vehicle on a road portion having two or more lanes, the vehicle comprising an Automated Driving System, ADS, feature, the system comprising control circuitry configured to obtain map data associated with the road portion. The control circuitry is further configured to obtain positioning data indicating a position of the vehicle on the road and obtain sensor data from a sensor system of the vehicle. The control circuitry is configured to initialize a filter per lane of the road portion based on the obtained map data, the obtained positioning data, and the obtained sensor data, wherein each filter indicates an estimated state of the vehicle on the road portion. Further, the control circuitry is configured to select one of the initialized filters by means of a trained machine-learning algorithm configured to use the obtained map data, the obtained positioning data, the obtained sensor data, and each estimated state as indicated by each filter as input and to output a single selected initialized filter indicative of a current state of the vehicle on the road portion. The control circuitry is also configured to control the ADS feature of the vehicle based on the selected initialized filter.

According to yet another fifth aspect, there is provided a vehicle comprising one or more vehicle-mounted sensors configured to monitor a surrounding environment of the vehicle. The vehicle further comprises a localization system configured to monitor a geographical position and heading of the vehicle. The vehicle further comprises a system according to the fourth aspects and various embodiments of the fourth aspect. The vehicle further comprises an ADS feature for controlling one or more of acceleration, steering, and braking of the vehicle.

Further embodiments of the different aspects are defined in the dependent claims.

It is to be noted that all the embodiments, elements, features and advantages associated with the first aspect also analogously apply to the second, third, fourth and the fifth aspects of the present disclosure.

These and other features and advantages of the present disclosure will in the following be further clarified in the following detailed description.

BRIEF DESCRIPTION OF THE DRAWINGS

Further objects, features and advantages of embodiments of the disclosure will appear from the following detailed description, reference being made to the accompanying drawings. The drawings are not to scale.

DETAILED DESCRIPTION

Figure 1:
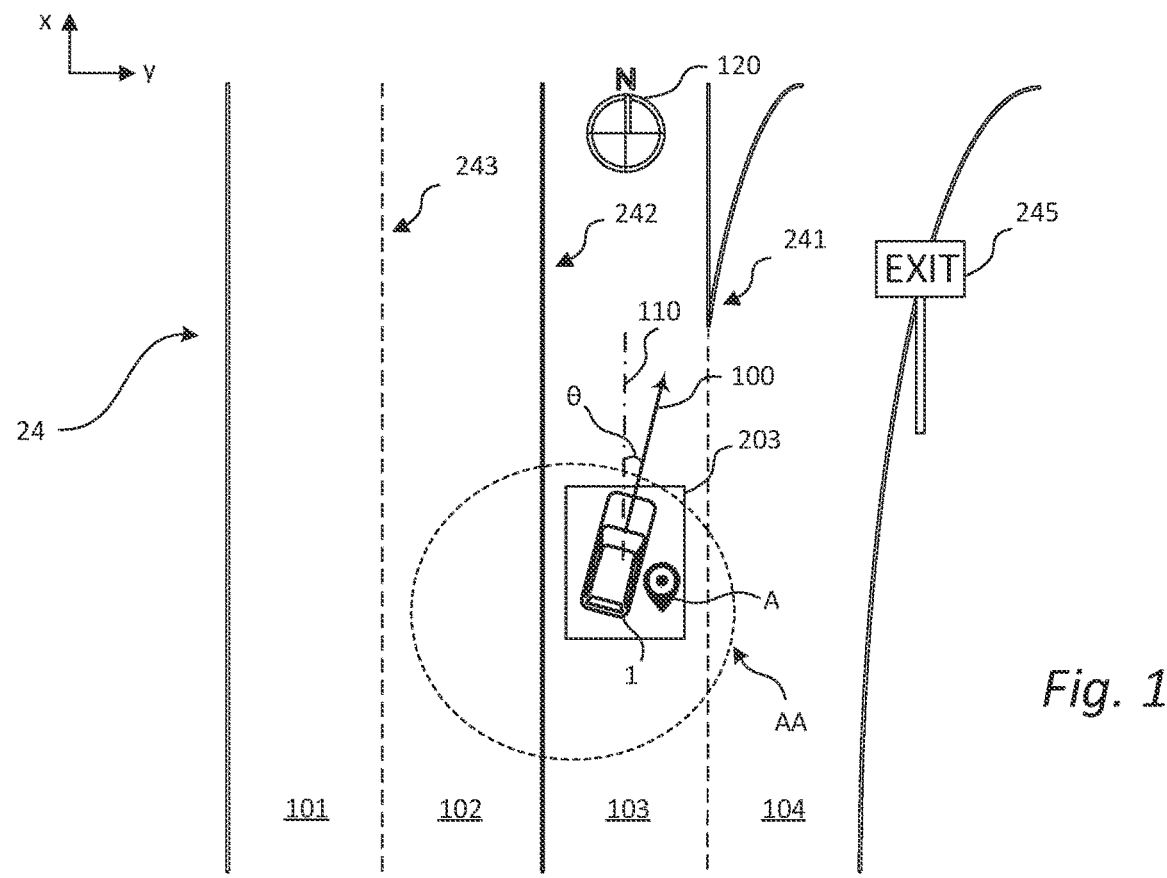
FIG. 1 shows a schematic top view of a road portion having multiple lanes and a vehicle traveling on the road portion in accordance with some embodiments.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Even though the following disclosure mainly discusses vehicles in the form of cars, the skilled reader readily realizes that the teachings discussed herein are applicable to other forms of vehicles such as trucks, buses and construction equipment.

Figure 2:
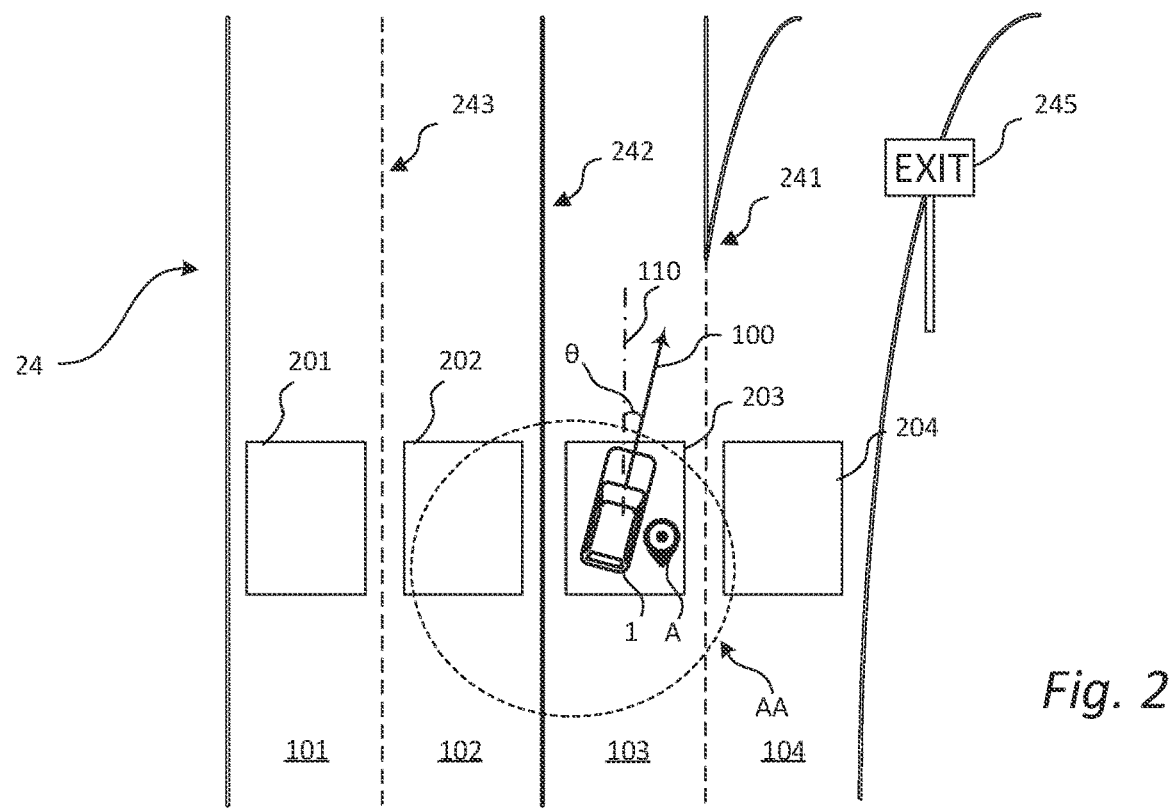
FIG. 2 shows a schematic top view of a road portion having multiple lanes and a vehicle traveling on the road portion in accordance with several embodiments.

FIG. 1 and FIG. 2 illustrate schematic perspective top views of a vehicle 1 comprising an Automated Driving System (ADS). Moreover, the ADS comprises one or more ADS features that are preferably a level 3 feature or higher according to SAE J3016 levels of driving automation for on-road vehicles. In the present context, an ADS feature may be in the form of an autopilot feature, a traffic jam pilot, a highway pilot, or any other SAE J3016 level 3+ ADS feature. The vehicle 1 may also be referred to as the ego-vehicle.

The vehicle 1 comprises a control system 10 for controlling a driver support function (i.e. an ADS feature) for autonomously maneuvering the vehicle 1 according to several embodiments and aspects of the present disclosure. The control system 10 may be a part of the overall ADS architecture of the vehicle, and may accordingly be a module or component of the ADS. The control system 10 of the vehicle 1 comprises control circuitry 11 configured to obtain data comprising information about the surrounding environment of the vehicle 1. The vehicle is also provided with a localization system 5 which in communication with the control system 10 are configured to provide an estimation of the vehicle's 1 state or pose i.e. vehicle's geographical position and heading on the road portion 24. The term obtaining is herein to be interpreted broadly and encompasses receiving, retrieving, collecting, acquiring, and so forth.

The state of the vehicle in the context of this disclosure can be construed as having three physical states, namely the longitude, the latitude and the heading of the vehicle. The longitude and the latitude are defined with respect to a geographical coordinate system such as the Cartesian coordinate system and indicate the longitudinal position and lateral position of the vehicle on the road portion. The heading of the vehicle indicates the compass direction of the vehicle with respect to the geographical north 120 and is typically understood as an angle (θ) between a vector 100 of a forward-orientation of the vehicle and a center line 110 extending from the vehicle towards the geographical north. The state of the vehicle may also be referred to as a pose of the vehicle. The pose is in some embodiments represented by a 2D Cartesian position and a yaw of the vehicle (x, y, θ). However, in some embodiments, the pose is a 6D pose where the position is defined by a 3D Cartesian position and the orientation is defined by a roll, pitch, and yaw of the vehicle.

FIGS. 1 and 2 show the ego-vehicle 1 travelling on a portion 24 of a road. In this example, the road is in the form of a carriage way having four lanes 101-104, and the road portion 24 is a portion of the carriage way. In several other examples and embodiments, the road may be any other type of road e.g. a highway with dual carriageways. The road may also be a motorway, freeway or expressway. The road may also be a country road, rural road or any other carriageway. The road may have a plurality of lanes such as more than one lane in the same travelling direction e.g. two or more lanes or at least one lane in each travelling direction as is usually the case for rural roads.

The control system 10 of vehicle 1 is configured to determine the geographical position and heading of the vehicle on the road portion 24 based on data from the localization system 5 comprising positioning data such as GNSS data indicating a position of the vehicle on the road portion 24, map data associated with the road portion 24 and sensor data obtained by the from a perception system i.e. sensor system 6 of the vehicle 1. In several embodiments, the vehicle may utilize a localization system 5 in the form of a suitable satellite based positioning systems, such as either one of a GNSS or a corresponding regional system such as e.g. a GPS, Globalnaya Navigazionnaya Sputnikovaya Sistema (GLONASS), Galileo, Beidou, etc.

The localization system 5 may comprise or be associated with an HD-map module. An HD-map is in the present context to be understood as map comprising data with highly accurate and realistic representations of the road travelled upon by the vehicle 1. In more detail HD-maps may be understood as maps that are particularly built for autonomous driving purposes. These maps have an extremely high precision, oftentimes at a centimeter-level. Moreover, the maps generally contain information such as where the lanes are, where the road boundaries are, where the curves are, how high the curves are, and so forth.

The control system 10 may for in various aspects and embodiments comprise or be associated with an Inertial Measurement Unit (IMU). An IMU may be understood as a device configured to detect linear acceleration using one or more accelerometers and rotational rate using one or more gyroscopes. Thus, in some embodiments, the sensor data may be in the form of sensor data obtained from the IMU. The output from the IMU is then used to estimate a change in the vehicle's pose over time. In more detail, the prediction of the vehicle's pose may be estimated based on a vehicle motion model together with motion sensor data (e.g. data from accelerometers and gyroscopes, which will herein collectively be referred to as motion sensors). The obtained sensor data may additionally comprise information about a state of one or more other external vehicles in the surrounding environment of the ego-vehicle, lane marker geometry on the two or more lanes of the portion 24 of the road, lane marker 241-243 type (e.g. solid, dashed, double marker, etc.) on the portion 24 of the road, traffic sign information 245, road barrier information, etc.

In various aspects and embodiments, the prediction of the pose of the vehicle performed by the control system 10 may comprise using linear or non-linear filtering e.g. by using a Bayesian filter or a combination of multiple Bayesian filters. In several aspects and embodiments, each Bayesian filter may be one of Kalman Filter, Extended Kalman Filter (EKF), Unscented Kalman Filter (UKF), Cubature Kalman Filter (CKF), and Particle Filter (PF). The selection of the Bayesian filters may be based on design factors or quality of obtained sensor data e.g. the linearity of the sensor measurement models which may control the use of suitable filters or filter combinations for different sensors. In general, the process of extracting information from a (dynamical) system, may be referred to as filtering.

In an example shown in FIG. 1, the localization system 5 of the vehicle 1, obtains a GNSS position of the vehicle 1 on the road portion 24. This position is marked as an initial position "A" of the vehicle 1 and a single filter comprising a Bayesian filter or a combination of Bayesian filters are initialized based on the initial position of vehicle 1 as well as the HD-map data of the road portion 24 together with the sensor data to predict the state of the vehicle 1 of the road portion.

However, one inherent problem associated with the above prediction of the state of the vehicle on the road portion 24 is that the uncertainty of the GNSS position data propagates into the initialized filter. In FIG. 1, the vehicle 1 is located in lane 103 on the road portion 24. The obtained GNSS data indicates the initial position "A" for the vehicle 1. The GNSS data however is associated with the uncertainty "AA" indicated with the dashed circle. A filter 200 is initialized around the initial position "A". Since the GNSS uncertainty directly affects the filter initialization, it cannot be determined with certainty if the vehicle 1 is actually travelling on lane 103. It is practically possible that the vehicle 1 is travelling on lane 102 or 104 and due to the error in the obtained GNSS data, the filter initialization returns a false estimation of the state of the vehicle 1 on the road portion 24.

When it comes to autonomous vehicles, an accurate localization of the vehicle state is of great importance in order to make safe decisions without endangering a vehicle's occupants or external objects, particularly when using the ADS features.

The inventors therefore have realized that by initializing multiple filters 201-204 for the multi-lane road portion 24 of FIG. 2 such that one filter is initialized per lane 101-104 of the road portion 24, the safety and certainty of the pose estimation of the vehicle 1 on the road portion may be increased noticeably. Even though, this approach requires more computation and processing compared to initializing a single filter around the initial GNSS position, it however allows for a much safer and more certain decision making, especially for controlling the ADS feature of the ego-vehicle 1.

As shown in FIG. 2, by initializing a filter 201-204 per lane 101-104 on the road portion 24, each filter continuously provides an estimation of the state of the vehicle 1 on its designated lane based on the positioning data, obtained sensor data and the HD-map data. Each filter may comprise a Bayesian filter or a combination of Bayesian filters. This way, the most accurate initialized filter amongst the plurality of initialized filters 201-204 can be identified and selected which in turn will indicate the most accurate pose of the vehicle 1 on the road portion 24.

It should be noted that the filter initialization is designed to be a continuous process for controlling the ADS feature of the ego-vehicle 1 and it is possible that in some scenarios, all or some of the initialized filters and their respective pose estimations will be terminated and a filter re-initialization in all or some of the lanes will be repeated.

However, to select the most accurate initialized filter amongst the plurality of initialized filters 201-204, it is required to establish algorithms which will efficiently perform the selection process. One approach to identify the most accurate initialized filter 201-204 is to define a library of predefined rules and requirements and eliminate the undesired estimations of the vehicle pose for the initialized filters which do not meet the set of rules or requirements. Stated differently, the initialized filter which most closely meets the predefined rules in comparison to the other initialized filters can be identified and selected as indicative of the most accurate state of the vehicle 1 on the road portion. For instance, in some examples a set of predefined requirements may be introduced as follows.

In one example, if the pose estimation of the initialized filter under scrutiny is determined to be far away from the initial GNSS position of the vehicle 1 on the road portion 24, this filter can be eliminated. In a different example, if the detected lane marker types in the vicinity of the estimated pose of the initialized filter under scrutiny acquired from the sensors e.g. cameras, are determined to be different from the lane marker types on the same location on the HD-map data, then this filter can be eliminated. In yet another example, if the detected lane marker geometry in the vicinity of the estimated pose of the initialized filter under scrutiny acquired from the sensors e.g. cameras, are determined to be different from the lane marker geometry on the same location on the HD-map data, this filter can be eliminated. In a further example, if based on the pose estimation of the initialized filter under scrutiny, the external vehicles in the surrounding environment of the vehicle 1 are determined to be positioned outside the road portion 24, this filter can be eliminated. In yet another example, if the traffic sign information in the vicinity of the estimated pose of the initialized filter under scrutiny does not match the traffic sign information on the HD-map data, this filter can be eliminated. In some examples, different severity scores may be assigned to each of the predetermined rules and evaluation of the fulfilment of the rule for elimination of a filter. Therefore, in some instances a single observation of fulfillment of a predetermined requirement may not be enough to eliminate a filter, but rather multiple observations of fulfillment of several predetermined requirements may be utilized. For example, it might not be possible to eliminate a filter based on either only lane geometries or only the conditions of the surrounding external vehicles, but a combination of the two rules can provide adequate information to eliminate a filter.

As readily understood by the skilled reader, different other predefined rules may be applied to select the most accurate estimation by the initialized filters 201-204.

However, rule-based control algorithm design is limited by the initial setting of all the rules, and it can easily miss or involve design errors when multiple rules need to be considered (i.e. they are to some extent prone to human error). It is even more challenging to determine and assign values or ranges of values such as predetermined threshold values to these rules. Formal methods is one of the ways to solve verification challenge of testing a complex rule based control algorithm, but it requires good modelling of the algorithm. Therefore, some scenarios still cannot be covered well by designing or by real world driving including corner case scenarios, which are very valuable for the ADS and its functionality validation. For example, in some scenarios two of the initialized filters may be associated with very similar environmental parameters (e.g. both filters are associated with the vehicle traveling in a lane that has dashed lane markers on both sides) making it difficult to discard any one of the two filters as erroneous. In such scenarios, one may need to wait for an "event" to occur that at the same time has to be accounted for in the pre-defined rules (e.g. an external vehicle passing the ego-vehicle). In such scenarios, the final selection of a single initialized filter may be delayed and the state of the vehicle remains uncertain for the duration of the period.

Thus, the inventors have further realized that by using a data-driven approach comprising the use of machine learning algorithms to identify and select the most promising initialized filter out of the plurality of initialized filters of a multi-lane road, the possibilities of accurately estimating the state of the vehicle (e.g. the pose of the vehicle) on the road portion 24 improves even more significantly. To this end, the machine learning algorithms can be used to influence and promote behavior that increases the possibility for accurately estimating the state of the vehicle in various scenarios including the aforementioned corner case or edge case scenarios involving multiple environmental variables or conditions happening simultaneously or outside the conventional levels.

Figure 3:
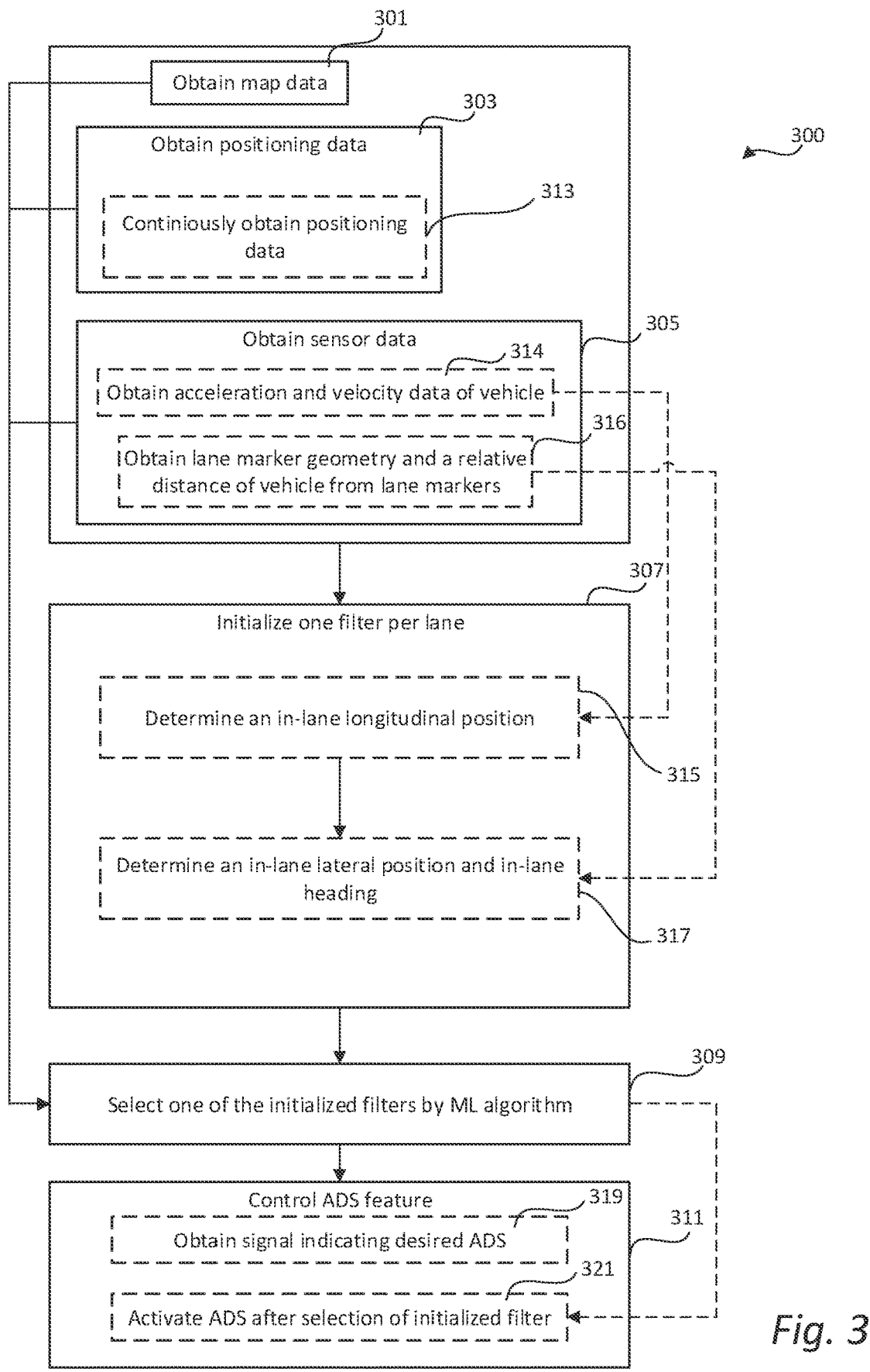
FIG. 3 is a schematic flow chart illustrating a method in accordance with several embodiments.
Figure 4A:
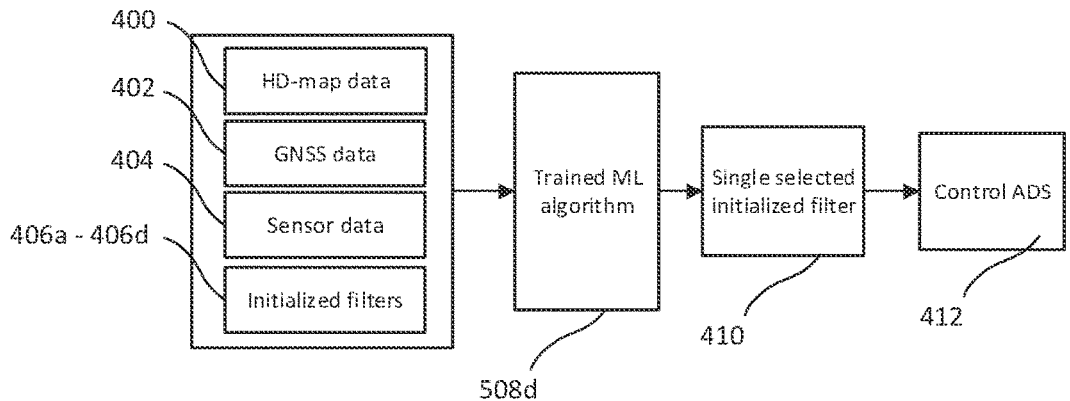
FIGS. 4a-b show schematic block diagrams of the machine learning algorithm and selection of an initialized filter by the machine learning algorithm in accordance with several embodiments.

FIG. 3 shows a flowchart of a method 300 according to various aspects and embodiments of the present disclosure for determining a state of a vehicle 1 on a road portion 24 having two or more lanes 101-104. The method comprises obtaining 301 map data 400, as shown in the block diagram of FIG. 4a, associated with the road portion 24. As mentioned earlier the map data is typically the HD-map data comprising data with highly accurate and realistic representations of the road portion 24. The method further comprises obtaining 303 positioning data 402 indicating a position of the vehicle 1 on the road. More specifically, the initial GNSS position "A" of the vehicle 1 on the road portion 24 is obtained by the localization system 5. In several embodiments, the positioning data may comprise an initial longitude, initial latitude and an initial heading of the vehicle 1 connected to the initial GNSS position "A" of the vehicle. The control system 10 is configured to perform the method step of obtaining 305 sensor data 404 from a sensor system i.e. perception system 6 of the vehicle 1 comprising a variety of different sensors such as sensors 6a-6c illustrated for the vehicle 1 of FIG. 5.

The method further comprises initializing 307 a filter 201-204 per lane 101-104 of the road portion 24 based on the obtained map data 400, the obtained positioning data 402, and the obtained sensor data 404, wherein each filter 201-204 indicates an estimated state 406a-406d of the vehicle 1 on the road portion 24. As mentioned earlier each filter may employ a Bayesian filter or a combination of different Bayesian filters suitable for the specific scenario to estimate the state of the vehicle 1. In the context of the present disclosure, the outcome or output of each filter 201-204 may also be referred to as a hypothesis. Each hypothesis therefore is an estimation of the pose or state of the vehicle 1 on a designated lane among the plurality of lanes 101-104 of the road portion 24. The inventive method and system presented here therefore scrutinizes each hypothesis to select a most promising hypothesis indicative of the most accurate state of the vehicle on the road portions. Accordingly, the method 300 comprises selecting 309 one of the initialized filters 201-204 by means of a trained machine-learning algorithm 508d. Details of training the trained machine learning (ML) algorithm 508d is described in detail below with reference to FIG. 4b. As shown in the schematic block diagram of FIG. 4a, the trained machine learning algorithm 508d is configured to use the obtained map data 400, the obtained positioning data 402, the obtained sensor data 404, and each estimated state 406a-406d as indicated by each filter 201-204 as input and also configured to output a single selected initialized filter 410 indicative of a current state of the vehicle 1 on the road portion 24. Yet further, the method comprises controlling 311 the ADS feature 412 of the vehicle 1 based on the selected initialized filter 410.

In some embodiments, the initializing 307 of the filters 201-204 per lane 101-104 of the road portion 24 may further comprise, for each filter continuously obtaining 313 the positioning data 402 of the vehicle 1 on the road over time. In other words, obtaining the initial GNSS position "A" of the vehicle 1 on the road portion 24 is an iterative process and the localization system 5 is configured to repeatedly acquire the initial position "A" over a certain period of time, in predetermined intervals, or based on any other suitable temporal scheme. This way the certainty of the obtained positioning data 402 is noticeably elevated which contributes to reducing the margin of error when estimating the vehicle pose 406a-406d by each filter 201-204. In several embodiments, the initial longitudinal position, initial lateral position and initial heading (initial pose) comprised in the positioning data connected to the initial position "A" of the vehicle may be obtained from a satellite positioning module, wherein the satellite positioning module may use a Kalman filter or any variants of a Kalman filter such as an extended Kalman filter, an unscented Kalman filter, or a cubature Kalman filter, to continuously estimate the vehicle's pose with inputs of GNSS data, and a predefined motion model of the vehicle. This way initial positioning data of the vehicle 1 comprising initial longitude, initial latitude and initial heading may be obtained.

In a prediction phase, the motion model may be used together with the velocity and/or acceleration data e.g. as obtained from the IMU to predict the vehicle's pose. The continuously-obtained positioning data e.g. GNSS data may be applied to the Kalman filter to update the vehicle's pose (i.e. the "update" phase). An output of the satellite positioning module is geodetic vehicle pose, including the initial heading, initial longitude, initial latitude, or in some embodiments an initial altitude of the vehicle. To determine the in-lane pose of the vehicle, the output of the satellite positioning module needs to be translated into a lane-related set of longitudinal, lateral and heading information which will be used to initialize the filter for each lane. In several embodiments, a pose converter may be used to transform the initial vehicle pose (output of the satellite positioning module) from geodetic coordinates to a local Cartesian coordinate system. As a result, the initial vehicle pose can be represented as a longitudinal position, a lateral position, and a heading as will be explained in the following.

The method further comprises obtaining 305 sensor data 404 wherein obtaining the sensor data comprises obtaining 314 at least one of acceleration and velocity of the vehicle 1. The control system 10 may obtain the velocity and/or acceleration data from the IMU as mentioned earlier. By obtaining the velocity and/or acceleration data as well as a temporal positioning profile of the vehicle 1, an in-lane longitudinal position (x) of the vehicle 1 on the road portion 24 can be determined 315.

Further, in several aspects and embodiments, initializing the filter per lane of the road portion may comprise, for each filter obtaining 305 sensor data 404 comprising obtaining 316 the lane marker geometry and a relative distance of the vehicle 1 from the lane markers 241-243 on the road portion 24. By retrieving the information about the lane markers on the road portion and calculating the relative distance of the vehicle from different lane marker types (e.g. the lane markers located on a right side and/or on a left side of the vehicle), the method advances to determining 317 an in-lane lateral position (y) and in-lane heading 100 of the vehicle 1 on the road portion 24. By determining the longitudinal and in-lane lateral position of the vehicle, the heading of the vehicle can be determined. To determine the heading 100 of the vehicle, a tangent of the angle "θ" along the center line 110 (being substantially parallel with the extension of at least one of the lanes on the road portion 24) of the vehicle is calculated. As a result, the direction of the tangent 100 along the lane is determined as the initialization for the heading of the vehicle.

Accordingly, in some embodiments each filter is initialized based on the determined longitudinal position (x) and in-lane lateral position (y) and heading 100 of the vehicle 1 on the road portion for each filter 201-204.

In some embodiments and aspects the method 300 further comprises obtaining 319 a signal indicative of a desired activation of the ADS feature. Controlling 311 the ADS feature may comprise activating 321 the ADS feature after the selection of the initialized filter 410 has been made and using the selected initialized filter 410 to indicate the vehicle's state on the road.

Further, as is readily understood by the skilled reader, the order of the different steps of the method 300 is not necessarily in accordance with the depicted embodiment of FIG. 3, but may vary depending on specific implementations. In more detail, several of the steps may occur in parallel or with partial occurrence as the various processes may be construed as sub-processes handled by separate modules, as described in the foregoing. For example, the step of obtaining 301 map data, obtaining positioning data 303, and obtaining sensor data 305 may occur at several instances or continuously throughout the method 300 in order to feed each separate module with the necessary input data.

For the purpose of the presented method, the machine learning algorithms may be trained based on conventional real-world data which is obtained through hours of driving the vehicle 1 on various types of roads under a variety of environmental conditions to collect and evaluate the data sets for various scenarios. The ML algorithms can define and use criteria which are based on the collected and validated data sets in the training process of the ML algorithms rather than a predefined set of rules for selecting the most promising initialized filter. Particularly, the process of training the ML algorithm may comprises pre-processing, training, testing, and validating phases, the details of which will be explained further down and also with reference to FIG. 4b. To this end, HD-map data, positioning data, various sensor measurements including camera, radar, LIDAR, GNSS, IMU, pose of other external vehicles in the surrounding environment of the ego-vehicle 1, geometry and type of lane markers, traffic signs and traffic information, road barriers, weather forecast, etc. may be employed as input data for the ML algorithm. Further, reference data, also referred to as "ground-truth" data from the real-world driving data collection which include the actual poses and trajectories of the ego-vehicle can be used.

In the pre-processing phase, the data may be divided randomly in groups to create a training dataset, a testing dataset, and a validation dataset. In several embodiments and aspects, the data in each dataset may further be normalized. The normalized datasets can be generated by comparing the obtained sensor data i.e. raw sensor measurements from the sensor system 6a-6c of the ego-vehicle, IMU, GNSS, etc. against the HD-map data, and normalizing the compared raw data based on a normalization approach. The normalization approach may in several embodiments be a normalized similarity score e.g. between a range of 0 to 1. In some embodiments the normalization may be performed by using linear scaling, clipping, log scaling, z-score or similar normalization method known in the field.

The pre-possessing phase may further comprise generating a set of normalized reference data i.e. normalized ground-truth data of the ego-vehicle 1. The normalized reference data may be generated by comparing a predetermined pose and trajectory of the ego-vehicle on the road portion 24 against the HD-map data, and normalizing the compared reference data based on a normalization approach. For example, referring to FIG. 1, the designed normalization strategy may assign a value of 0 to the left-most lane 101 amongst the plurality of lanes in the multi-lane road portion 24. Similarly, a value of 1 may be assigned to the right-most lane 104 amongst the plurality of lanes. In the road portion 24 having 4 lanes 101-104, the normalization of the ground-truth data of the vehicle's pose may comprise comparing the ground-truth pose of the vehicle 1 to the HD-map data and if the vehicle is located on the right-most lane 104, assigning a normalized value of 1 to this ground-truth pose of the vehicle 1.

Figure 4B:
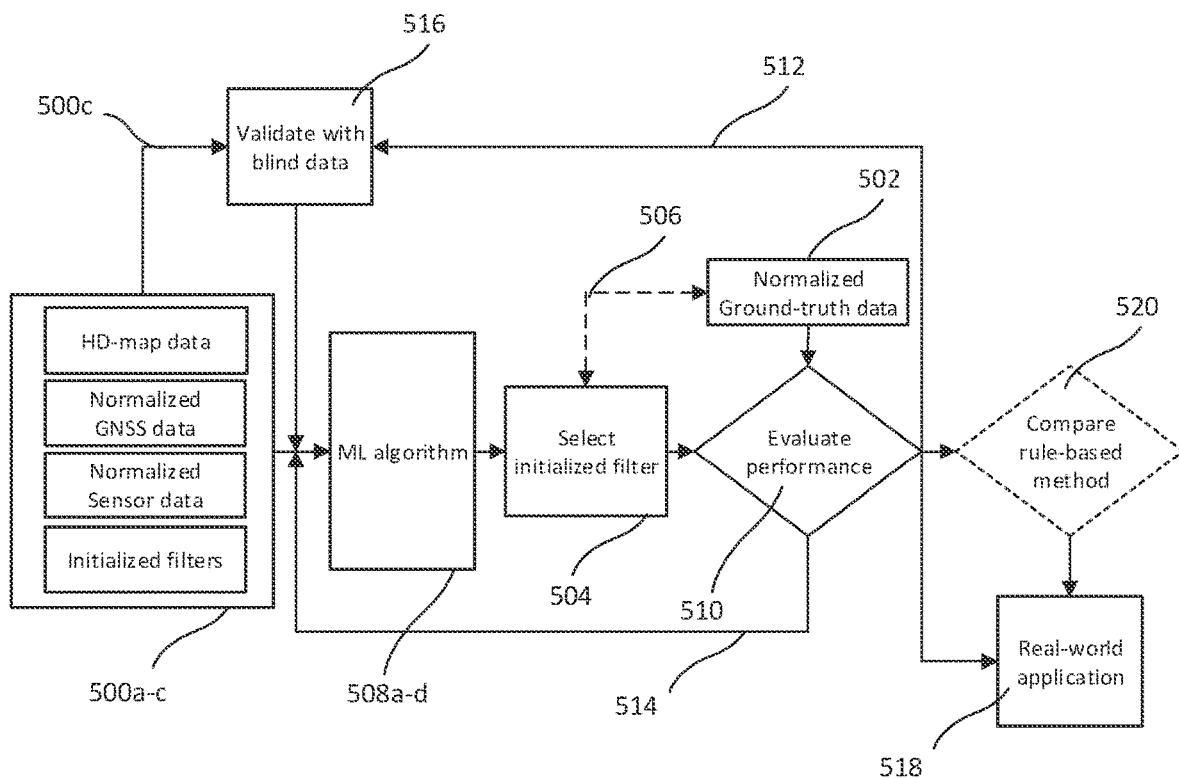

In the training phase as shown in the block diagram of FIG. 4b, the normalized training dataset 500a generated in the pre-processing phase together with the HD-map data and the initialized filters may be used as input data 500a to a ML algorithm 508a and the normalized reference data in the pre-processing phase can be used as the output reference data 502. The ML algorithm 508a is the untrained version of the ML algorithm. The training phase may then comprise selection 504 of the initialized filter based on supervised learning models such as support vector machine (SVM), random forest (RF), artificial neural networks (NN), etc. The training may further comprise prediction based on sequential i.e. temporal measurements, e.g. long short-term memory (LSTM), recurrent neural networks (RNN), attention mechanisms, transformer networks, etc. The ML algorithm may further be customized based on the training requirements in the training phase and based on the comparisons 506 of the predictions made by the ML 508a and the differences of the prediction with the output reference data 502.

In the testing phase, the first trained version of the ML algorithm 508b from the training phase is used. Similar to the training dataset 500a, the testing data set 500b which is also normalized in the pre-processing phase is fed as input data 500b to the first trained version of ML algorithm 508b. The output of the ML algorithm 508b will be the selected hypothesis or the selected initialized filter amongst the plurality of initialized filters similar to the training phase.

However, since in the testing phase the ML algorithm 508b is the first trained version of the ML algorithm, the testing phase may further comprise evaluating 510 the performance of the first trained version of the ML algorithm 508b. The performance in this context is to be understood as the success rate of correct predictions or selecting the most promising initialized filter indicative of the most accurate state of the vehicle on the road portion. The evaluation 510 of the performance may comprise comparing the frequency of successful predictions of the first trained version of the ML algorithm 508b i.e. the number of correct selections of the initialized filter by the first version of the trained ML algorithm 508b indicative of the pose of the ego-vehicle on the two or more lanes 101-104 of the road portion 24 with a predetermined threshold value. The predetermined threshold value in this context is indicative of an acceptable rate of agreement between the correctly selected initialized filter by the ML algorithm and the normalized reference data. If the frequency of successful performance of the ML algorithm can be determined to exceed the predetermined threshold value 512, the ML algorithm can be prepared for the validation phase 516. However, if the frequency of successful performance of the trained ML algorithm in selecting the correct initialized filter falls below the predetermined threshold value 514, then the ML algorithm may be trained further using the training dataset 500a.

Accordingly, if the evaluation of the performance of the ML algorithm indicates that the performance is above the predetermined threshold value, the trained ML algorithm is presented with the normalized validation dataset 500c. The validation dataset should never be presented to the ML algorithm before the trained ML algorithm passes the performance evaluation i.e. is a tested or fixed model 508c. Thus, the validation phase 516 may comprises presenting the normalized validation dataset 500c i.e. the blind data 500c to the fixed ML algorithm 508c as input. The output of the fixed ML algorithm 508c will then be the selected hypothesis i.e. the single selected initialized filter indicative of the current state of the vehicle on the road portion. The validation phase may further comprise evaluating the performance of the fixed ML algorithm based on the normalized ground-truth data 502. Similarly, in the validation phase the performance of the fixed ML algorithm 508c is compared against a predetermined threshold value and if the performance is above such threshold value, the fixed ML algorithm is considered to be the trained ML algorithm 508d ready to use in real-world applications 518 with real-time measurements received from the sensor system 6 of the vehicle 1.

The evaluation of performance of the trained ML algorithm 508d may further comprise, comparing the performance of the trained ML algorithm 508d to a rule-based control algorithm 520 manually designed as a baseline method.

Executable instructions for performing these functions are, optionally, included in a non-transitory computer-readable storage medium or other computer program product configured for execution by one or more processors.

Figure 5:
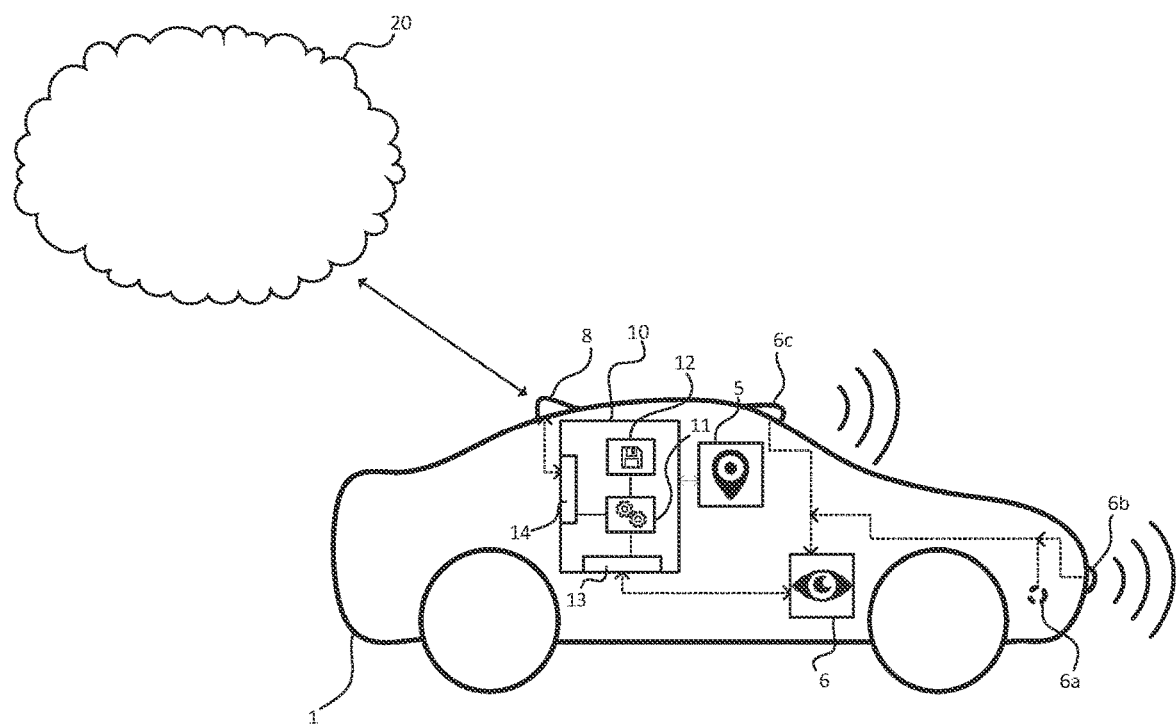
FIG. 5 shows a schematic side view illustration of the vehicle comprising the control system in accordance with some embodiments.

FIG. 5 is a schematic side view of a vehicle 1 comprising a control system 10 (control device) for determining a state of the vehicle 1 (such as e.g. a pose of the vehicle 1). The vehicle 1 further comprises a perception system 6 and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. In particular, the vehicle 1 has at least one vehicle-mounted camera 6c for capturing images of (at least a portion of) a surrounding environment of the vehicle. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. Moreover, in the present context the vehicle 1 is assumed to have access to a digital map (e.g. a HD-map), either in the form of a locally stored digital map or via a remote data repository accessible via an external communication network 20 (e.g. as a data stream). In some embodiments, the access to the digital map may for example be provided by the localization system 5.

The control system 10 comprises one or more processors 11, a memory 12, a sensor interface 13 and a communication interface 14. The processor(s) 11 may also be referred to as a control circuit 11 or control circuitry 11. The control circuit 11 is configured to execute instructions stored in the memory 12 to perform a method for determining a state of an ADS-equipped vehicle on a road portion having one or more lanes according to any one of the embodiments disclosed herein. In more detail, the control circuitry 11 is configured to perform the method steps of FIG. 3 and with reference to FIG. 2 to select a single initialized filter by the ML algorithm on the multi-lane 101-104 stretch of road 24. The memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, M, DDR RAM, or other random access solid-state memory devices; and optionally includes non-volatile memory, such as one or more magnetic disk storage devices, optical disk storage devices, flash memory devices, or other non-volatile solid-state storage devices.

Further, the vehicle 1 may be connected to external network(s) 20 via for instance a wireless link (e.g. for retrieving map data). The same or some other wireless link may be used to communicate with other external vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. In several aspects and embodiments, there is provided a computer program product comprising instructions which, when the program is executed by one or more processors of a processing system, causes the processing system to carry out the method according to any one of the embodiments of the method of the present disclosure.

Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control system 10) may be or include any number of hardware components for conducting data or signal processing or for executing computer code stored in memory 12. The system 10 may have an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the ego-vehicle 1 further comprises a sensor interface 13 which may also provide the possibility to acquire sensor data directly or via dedicated sensor control circuitry 6 in the vehicle. The vehicle 1 also comprises a communication/antenna interface 14 which may further provide the possibility to send output to a remote location (e.g. remote operator or control centre) by means of an antenna 8. Moreover, some sensors in the vehicle may communicate with the control system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system, wherein the external system comprises the ML algorithm to select the single initialized filter. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method for determining a state of a vehicle on a road portion having two or more lanes, the vehicle comprising an Automated Driving System (ADS) feature, the method comprising:
   obtaining map data associated with the road portion;
   obtaining positioning data indicating a position of the vehicle on the road;
   obtaining sensor data from a sensor system of the vehicle;
   initializing a filter per lane of the road portion based on the obtained map data, the obtained positioning data, and the obtained sensor data, wherein each filter indicates an estimated state of the vehicle on the road portion;
   selecting one of the initialized filters by means of a trained machine-learning algorithm configured to use the obtained map data, the obtained positioning data, the obtained sensor data, and each estimated state as indicated by each filter as input and to output a single selected initialized filter indicative of a current state of the vehicle on the road portion;
   controlling the ADS feature of the vehicle based on the selected initialized filter.

2. The method according to claim 1, wherein each initialized filter is one of a Bayesian filter and a combination of multiple Bayesian filters.

3. The method according to claim 2, wherein each Bayesian filter is one of Kalman Filter, Extended Kalman Filter (EKF), Unscented Kalman Filter (UKF), Cubature Kalman Filter (CKF), and Particle Filter (PF).

4. The method according to claim 1, wherein the obtained sensor data comprises information about a state of one or more other vehicles in the surrounding environment of the vehicle, lane marker geometry, lane marker type, traffic sign information, road barrier information, and Inertial Measurement Unit (IMU) data.

5. The method according to claim 1, wherein initializing the filter per lane of the road portion comprises, for each filter:
continuously obtaining the positioning data of the vehicle on the road over time;
obtaining sensor data comprising at least one of acceleration and velocity of the vehicle; and
determining an in-lane longitudinal position of the vehicle on the road portion.

6. The method according to claim 5, wherein initializing the filter per lane of the road portion comprises, for each filter:
obtaining sensor data comprising the lane marker geometry and a relative distance of the vehicle from the lane markers on the road portion; and
determining an in-lane lateral position and an in-lane heading of the vehicle on the road portion.

7. The method according to claim 6, wherein each filter is initialized based on the determined longitudinal position and in-lane lateral position and heading of the vehicle on the road portion for each filter.

8. The method according to claim 1, wherein the map data comprises high definition (HD) map data.

9. The method according to claim 1, further comprising:
obtaining a signal indicative of a desired activation of the ADS feature;
wherein the step of controlling the ADS feature comprises activating the ADS feature after the selection of the initialized filter has been made and using the selected initialized filter to indicate the vehicle's state on the road.

10. A non-transitory computer-readable storage medium storing one or more programs configured to be executed by one or more processors of an in-vehicle processing system, the one or more programs comprising instructions for performing the method according to claim 1.

11. A system for determining a state of a vehicle on a road portion having two or more lanes, the vehicle comprising an Automated Driving System (ADS) feature, the system comprising control circuitry configured to:
obtain map data associated with the road portion;
obtain positioning data indicating a position of the vehicle on the road;
obtain sensor data from a sensor system of the vehicle;
initialize a filter per lane of the road portion based on the obtained map data, the obtained positioning data, and the obtained sensor data, wherein each filter indicates an estimated state of the vehicle on the road portion;
select one of the initialized filters by means of a trained machine-learning algorithm configured to use the obtained map data, the obtained positioning data, the obtained sensor data, and each estimated state as indicated by each filter as input and to output a single selected initialized filter indicative of a current state of the vehicle on the road portion;
control the ADS feature of the vehicle based on the selected initialized filter.

12. The system according to claim 11, wherein each initialized filter is one of a Bayesian filter and a combination of multiple Bayesian filters.

13. The system according to claim 11, wherein the obtained sensor data comprises information about a state of one or more other vehicles in the surrounding environment of the vehicle, lane marker geometry, lane marker type, traffic sign information, road barrier information, and Inertial Measurement Unit, IMU, data.

14. The system according to claim 11, wherein the control circuitry is further configured to:
obtain a signal indicative of a desired activation of the ADS feature;
control the ADS feature by activating the ADS feature after the selection of the initialized filter has been made and use the selected initialized filter to indicate the vehicle's state on the road.

15. A vehicle comprising:
one or more vehicle-mounted sensors configured to monitor a surrounding environment of the vehicle;
a localization system configured to monitor a geographical position and heading of the vehicle;
an Automated Driving System (ADS) feature for controlling one or more of acceleration, steering, and braking of the vehicle; and
a system according to claim 11.

* * * * *